(12) United States Patent
Calman et al.

(10) Patent No.: US 9,224,166 B2
(45) Date of Patent: Dec. 29, 2015

(54) RETRIEVING PRODUCT INFORMATION FROM EMBEDDED SENSORS VIA MOBILE DEVICE VIDEO ANALYSIS

(75) Inventors: Matthew A. Calman, Charlotte, NC (US); Erik Stephen Ross, Charlotte, NC (US); Alfred Hamilton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 772 days.

(21) Appl. No.: 13/342,053

(22) Filed: Jan. 1, 2012

(65) Prior Publication Data

US 2012/0233025 A1    Sep. 13, 2012

Related U.S. Application Data

(60) Provisional application No. 61/450,213, filed on Mar. 8, 2011, provisional application No. 61/478,411, filed on Apr. 22, 2011.

(51) Int. Cl.
| | |
|---|---|
| G06Q 30/00 | (2012.01) |
| G06Q 30/06 | (2012.01) |
| G06Q 10/00 | (2012.01) |
| G06Q 30/02 | (2012.01) |

(52) U.S. Cl.
CPC ............ *G06Q 30/0623* (2013.01); *G06Q 10/00* (2013.01); *G06Q 30/02* (2013.01); *G06Q 30/0641* (2013.01); *G06Q 30/0643* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | |
|---|---|---|
| 7,016,532 B2 | 3/2006 | Boncyk et al. |
| 7,155,228 B2 | 12/2006 | Rappaport et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |

(Continued)

OTHER PUBLICATIONS

Hollmer, M. (Mar. 19, 2004). MIT kicks off annual $50K business plan competition. The Boston Business Journal, 24, 24. Retrieved from http://search.proquest.com/docview/216355359?accountid=14753.*

(Continued)

*Primary Examiner* — Resha Desai
(74) *Attorney, Agent, or Firm* — Michael A. Springs; Moore & Van Allen PLLC; Nicholas C. Russell

(57) ABSTRACT

A system for accessing product information from embedded sensors via mobile device video analysis is disclosed. The system includes a processing device configured for analyzing a video stream of the surrounding environment captured on a mobile device. At least one product that has one or more embedded sensors associated therewith is identified within the surrounding environment. The system retrieves information associated with the one or more products from the one or more embedded sensors. Information retrieved, or information derived from the information retrieved, from the embedded sensors is presented to the user via a display of the video stream on the mobile device.

48 Claims, 8 Drawing Sheets

(56) References Cited

U.S. PATENT DOCUMENTS

| | | | |
|---|---|---|---|
| 7,565,008 | B2 | 7/2009 | Boncyk et al. |
| 7,680,324 | B2 | 3/2010 | Boncyk et al. |
| 7,775,437 | B2 | 8/2010 | Cohen |
| 7,792,738 | B2 | 9/2010 | Channell |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 8,138,930 | B1 | 3/2012 | Heath |
| 2002/0016739 | A1* | 2/2002 | Ogasawara ............... 705/22 |
| 2003/0064705 | A1 | 4/2003 | Desiderio |
| 2004/0021584 | A1 | 2/2004 | Hartz, Jr. et al. |
| 2004/0024709 | A1 | 2/2004 | Yu et al. |
| 2006/0100951 | A1 | 5/2006 | Mylet et al. |
| 2006/0227998 | A1* | 10/2006 | Hobgood et al. ............ 382/103 |
| 2007/0140595 | A1 | 6/2007 | Taylor et al. |
| 2008/0040278 | A1 | 2/2008 | DeWitt |
| 2008/0214210 | A1 | 9/2008 | Rasanen et al. |
| 2008/0268876 | A1 | 10/2008 | Gelfand et al. |
| 2008/0272914 | A1* | 11/2008 | Murray et al. ............ 340/572.1 |
| 2009/0094125 | A1* | 4/2009 | Killian et al. .................. 705/17 |
| 2009/0102859 | A1* | 4/2009 | Athsani et al. ............... 345/619 |
| 2009/0140839 | A1 | 6/2009 | Bishop et al. |
| 2009/0144164 | A1 | 6/2009 | Wane et al. |
| 2009/0171850 | A1 | 7/2009 | Yuval |
| 2009/0182748 | A1 | 7/2009 | Walker |
| 2009/0204511 | A1 | 8/2009 | Tsang |
| 2009/0250515 | A1 | 10/2009 | Todd et al. |
| 2010/0130226 | A1 | 5/2010 | Arrasvuori et al. |
| 2010/0185529 | A1* | 7/2010 | Chesnut et al. ................ 705/27 |
| 2010/0250581 | A1 | 9/2010 | Chau |
| 2011/0022540 | A1 | 1/2011 | Stern et al. |
| 2011/0034176 | A1 | 2/2011 | Lord et al. |
| 2011/0119155 | A1 | 5/2011 | Hammad et al. |
| 2011/0157357 | A1* | 6/2011 | Weisensale et al. .......... 348/143 |
| 2011/0202466 | A1 | 8/2011 | Carter |

OTHER PUBLICATIONS

International Preliminary Report on Patentability for International Application No. PCT/US2012/027892 dated Sep. 19, 2013.
International Preliminary Report on Patentability for International Application No. PCT/US2012/027890 dated Sep. 19, 2013.
International Preliminary Report on Patentability for International Application No. PCT/US2012/028036 dated Sep. 19, 2013.
International Preliminary Report on Patentability for International Application No. PCT/US2012/028008 dated Sep. 19, 2013.
International Preliminary Report on Patentability for International Application No. PCT/US2012/027912 dated Sep. 19, 2013.
International Search Report and Written Opinion for PCT/US12/48697, dated Oct. 12, 2012.
PCT International Preliminary Report on Patentability (IPRP) for International Application No. PCT/US2012/048697 dated Feb. 4, 2014.
International Search Report and Written Opinion for International Application No. PCT/US12/28008 dated May 22, 2012.
International Search Report and Written Opinion for International Application No. PCT/US12/28036 dated May 28, 2012.
International Search Report and Written Opinion for International Application No. PCT/US2012/027912 dated Jun. 8, 2012.
International Search Report and Written Opinion for International Application No. PCT/US12/27892 dated Jun. 14, 2012.
International Search Report and Written Opinion issued in PCT/US12/27890, dated Feb. 5, 2013.

* cited by examiner

| Payment Vehicle 810 | Payment Vehicle Number 820 | Name Associated with Payment Vehicle 830 | Expiration Date 840 | Security Code 850 | Credit/ Debit 860 | Default 870 |
|---|---|---|---|---|---|---|
| American Express | 3717******** | John Smith | 05/15 | 3423 | Credit | ○ |
| Visa | 4141******** | John Smith | 06/16 | 534 | Debit | ○ |
| MasterCard | 5512******** | John Smith | 07/19 | 321 | Credit | ○ |
| Discover | 6011******** | John Smith | 09/17 | 134 | Credit | ⊙ |
| American Express | 3214******** | Jane Smith | 12/17 | 3435 | Credit | ○ |
| Gift Card 1 | 8478******** | N/A | N/A | - | Debit | ○ |
| Gift Card 2 | 9520******** | N/A | N/A | - | Debit | ○ |

FIG. 8

RETRIEVING PRODUCT INFORMATION FROM EMBEDDED SENSORS VIA MOBILE DEVICE VIDEO ANALYSIS

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,411, filed Apr. 22, 2011, entitled "Retrieving Product Information From Embedded Sensors Via Mobile Device Video Analysis," the entirety of each of which is incorporated herein by reference.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional hardware and/or software that provide features and functionality that are becoming increasingly more common and standardized. Such features and functionality include, but are not limited to, location-determining functionality, such as Global Positioning System (GPS) functionality; hardware and/or software for sensing operational conditions of the devices or even the ambient conditions in which the devices are located, such as accelerometers and high-resolution video cameras.

As the hardware capabilities of such mobile devices have increased, so too have the software applications that control and operate the hardware. One such example of innovative software is a category known as augmented reality (AR), or more generally referred to as mediated reality.

Previous application platforms analyze location data and compass direction data in combination with information related to the objects, locations or other elements shown in the video stream to create browse-able "hot-spots" or "tags" that are superimposed on the mobile device display, resulting in an experience described as "reality browsing".

However, previous application platforms strictly utilizes GPS and compass data in order to create the "reality browsing." They are incapable of actually identifying objects within a video stream. Furthermore, they unable to "search" for predetermined objects in order to alert a user that a desired (or undesired) object is in the proximity.

Therefore, a need exists to implement video analysis and present it to the user as AR or the like, to assist the user of mobile devices with accessing product information from embedded sensors.

SUMMARY OF INVENTION

The following presents a summary of certain embodiments of the present invention. This summary is not intended to be a comprehensive overview of all contemplated embodiments, and is not intended to identify all key or critical elements of all embodiments nor delineate the scope of any or all embodiments. Its sole purpose is to present certain concepts and elements of one or more embodiments in a summary form as a prelude to the more detailed description that follows.

Methods, apparatuses, systems and computer program products are described herein that provide for using video analysis to process video streams and, more specifically, to access product information from embedded sensors and present information associated with the product to the user, which information may be presented via AR or the like. The information presented may be information retrieved or obtained from the embedded sensors or it may be information compiled using the information retrieved or obtained from the embedded sensors. The methods, apparatuses, systems, and computer program products may additionally provide for alerting the user to important or critical information associated with one or more products. In one embodiment, the user is presented with information pertaining to, and/or alerted to, important or critical product information, such as the depletion or expiration of a product that requires replacement or will require replacement in the near future or a requirement to obtain service for the product. In one embodiment, the embedded sensors may provide information necessary or beneficial in order to present desired information to the user. In another embodiment, through the use of vision object recognition, objects, logos, artwork, products, locations and other features of a product (referred to herein as attributes) that can be recognized from the surrounding environment represented in the video stream and that can be identified and matched to stored data or data that can be accessed in real-time (collectively, "preexisting data") in order to identify a product or information pertaining to the product or the user. In one embodiment, the preexisting data may comprise customer financial behavior history, customer credit score, customer purchase power/transaction history, wish lists, shopping lists, to do/task list, vendor information (contact information, account information, payment requirements and acceptable forms of payment, etc.), information regarding products and services (e.g., costs, availability, etc.), and/or other financial information concerning the customer. In this regard, embodiments of the present invention leverage institutional or proprietary financial data that is uniquely specific to a particular financial institution to provide information to users in connection with the video stream analysis.

To accomplish the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

In one embodiment of the present invention, a method is disclosed for accessing product information from embedded sensors. The method includes analyzing, via a processing device, a video stream representing the surrounding environment captured on a mobile device. The method further includes identifying one or more products within the video stream that has one or more embedded sensors associated therewith. Additionally, the method includes retrieving information associated with the one or more products from the one or more embedded sensors. Finally, the method includes presenting, via a display of the video stream on the mobile device, the information retrieved or obtained, or information derived from the information retrieved or obtained, from the one or more embedded sensors.

In one embodiment of the method, the mobile device is a mobile phone.

In one embodiment of the method, the mobile device includes a camera capable of image and/or video capture.

In one embodiment of the method, the one or more embedded sensors emit a radio frequency signal. In yet other embodiments of the method, the one or more embedded tags emit an other wave frequencies, such as infrared or X-ray.

Additionally, in one embodiment of the method, the mobile device is operated in the "always on" mode to continuously analyze the surrounding environment.

In one embodiment of the method, the information presented is displayed as a virtual object overlaying a real-time video stream of the surrounding environment. In one embodiment, the virtual object is interactive.

In still another embodiment, the method further includes alerting the user to important or critical information associated with one or more products. Alerting the user may be accomplished by producing an audible sound, vibration, generating a Short Message Service or text message, generating an email, or combinations thereof. The important or critical information may include information regarding a product default or an impending product default. In one embodiment, the product default is the depletion or expiration of the product requiring replacement. In another embodiment, the product default is a mechanical default requiring maintenance or repair services.

In one embodiment of the method, the one or more products is a food product. In another embodiment, the one or more products is a household item such as a household appliance, vehicle, monitoring systems, sensors in the handsets broadcasting the user's location for other friends to observe and/or discover.

In one embodiment, the method further includes presenting the user with an option to purchase the one or more products via the mobile device. In another embodiment, the method further includes transmitting payment information via a wireless connection between the mobile device and a contactless payment terminal to purchase a product.

In one embodiment, the method further includes transmitting financial data and/or other user-specific data to a financial institution.

In another embodiment of the present invention, a system for accessing product information from embedded sensors is disclosed. The system includes a processing device configured for analyzing a video stream representing the surrounding environment captured on a mobile device. The processing device is further configured for identifying one or more products within the video stream that has one or more embedded sensors associated therewith. Additionally, the processing device includes retrieving or obtaining information associated with the one or more products from the one or more embedded sensors. Finally, the processing device is further configured for presenting, via a display of the video stream on the mobile device, the information retrieved or obtained from the one or more embedded sensors.

In one embodiment of the system, the mobile device is a mobile phone.

In one embodiment of the system, the mobile device includes a camera capable of image and/or video capture.

In one embodiment of the system, the one or more embedded sensors emit a radio frequency signal.

Additionally, in one embodiment of the system, the mobile device is operated in the "always on" mode to continuously analyze the surrounding environment.

In one embodiment of the system, the information presented is displayed as a virtual object overlaying a real-time video stream of the surrounding environment. In some such embodiments, the virtual object is interactive.

In still another embodiment, the system further includes alerting the user to important or critical information associated with one or more products. Alerting the user may be accomplished by producing an audible sound, vibration, generating a Short Message Service or text message, generating an email, phone message, or combinations thereof. The important or critical information may include information regarding a product default or an impending product default. In one embodiment of the system, the product default is the depletion or expiration of the product requiring replacement. In another embodiment of the system, the product default is a mechanical default requiring maintenance.

In one embodiment of the system, the one or more products is a food product. In another embodiment, the one or more products is a household item such as a household appliance.

Furthermore, in one embodiment, the system further includes presenting the user with an option to purchase the one or more products via the mobile device. In still a further embodiment, the system further includes transmitting payment information via a wireless connection between the mobile device and a contactless payment terminal to purchase a product.

In another embodiment of the present invention, a computer program product for accessing product information from embedded sensors includes a non-transitory computer readable medium including one or more computer-readable code portions configured for analyzing a video stream of the surrounding environment captured on a mobile device. The one or more computer-readable code portions are further configured for identifying one or more products within the video stream that has one or more embedded sensors. Additionally, the one or more computer-readable code portions are further configured to retrieve or obtain information associated with the one or more products from the one or more embedded sensors. Finally, the one or more computer-readable code portions are further configured to present, via a display of the video stream on the mobile device, the information retrieved, or information derived from the information retrieved, from the one or more embedded sensors.

In one embodiment of the computer program product, the mobile device is a mobile phone.

In one embodiment of the computer program product, the mobile device includes a camera capable of image and/or video capture.

In one embodiment of the computer program product, the one or more embedded sensors emit a radio frequency signal or other light signal.

Additionally, in one embodiment of the computer program product, the mobile device is operated in the "always on" mode to continuously analyze the surrounding environment.

In one embodiment of the computer program product, the information presented is displayed as a virtual object overlaying a real-time video stream of the surrounding environment. In one embodiment, the virtual object is interactive.

In still another embodiment of computer program product, one or more computer-readable code portions are further configured for alerting the user to important or critical information associated with one or more products. Alerting the user may be accomplished by producing an audible sound, vibration, generating a Short Message Service or text message, generating an email, or combinations thereof. The important or critical information may include information regarding a product default or an impending product default. In one embodiment of the computer program product, the product default is the depletion or expiration of the product requiring replacement. In another embodiment of the system, the product default is a mechanical default requiring maintenance or repair services.

In one embodiment of the computer program product, the one or more products is a food product. In another embodiment, the one or more products is a household item such as a household appliance.

In one embodiment of the computer program product, the one or more computer-readable code portions if further configured to present the user with an option to purchase the one or more products via the mobile device. In still a further embodiment, the system further includes transmitting payment information via a wireless connection between the mobile device and a contactless payment terminal to purchase a product.

BRIEF DESCRIPTION OF THE DRAWINGS

Figure 1:
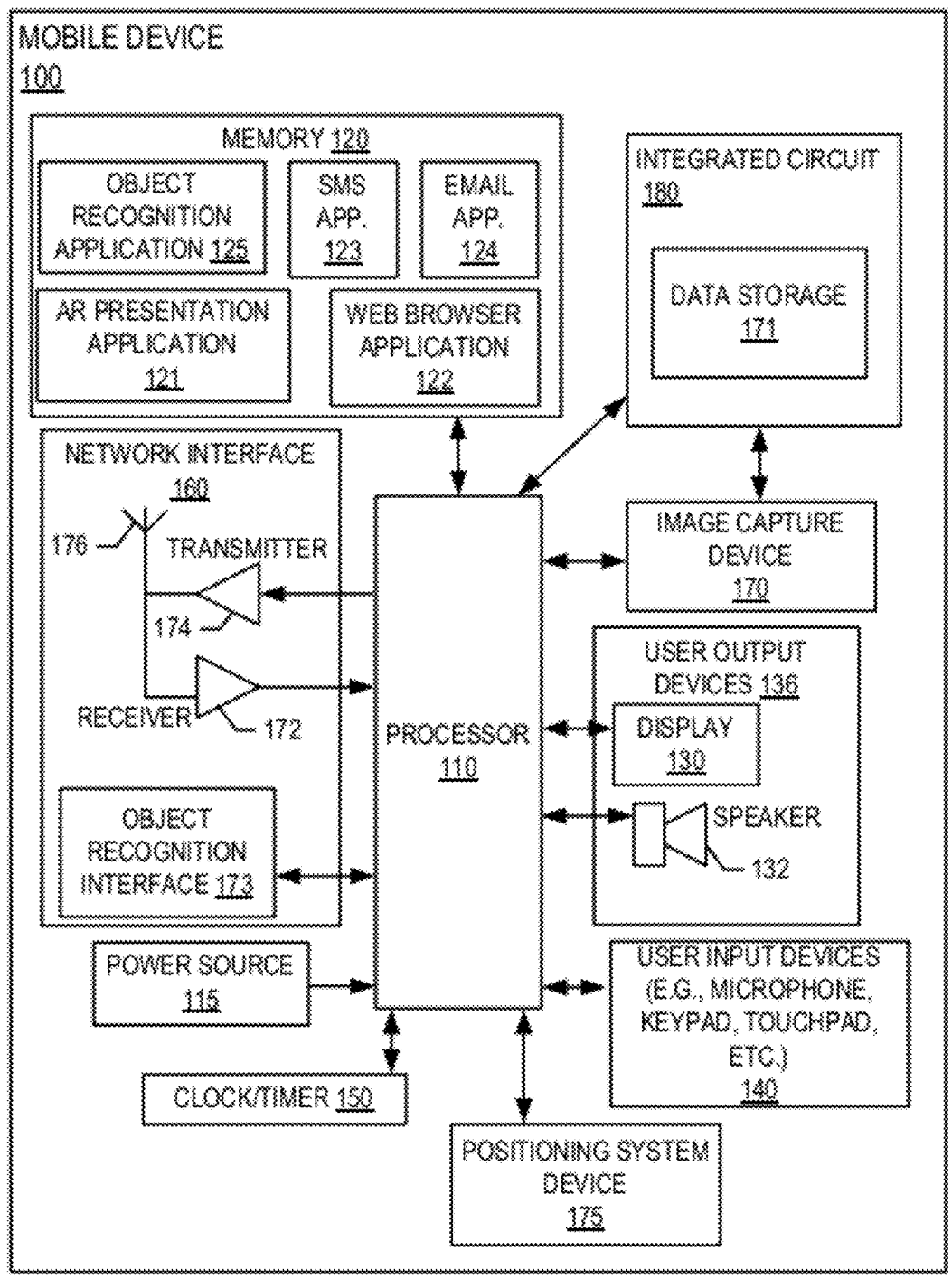
Figure 2:
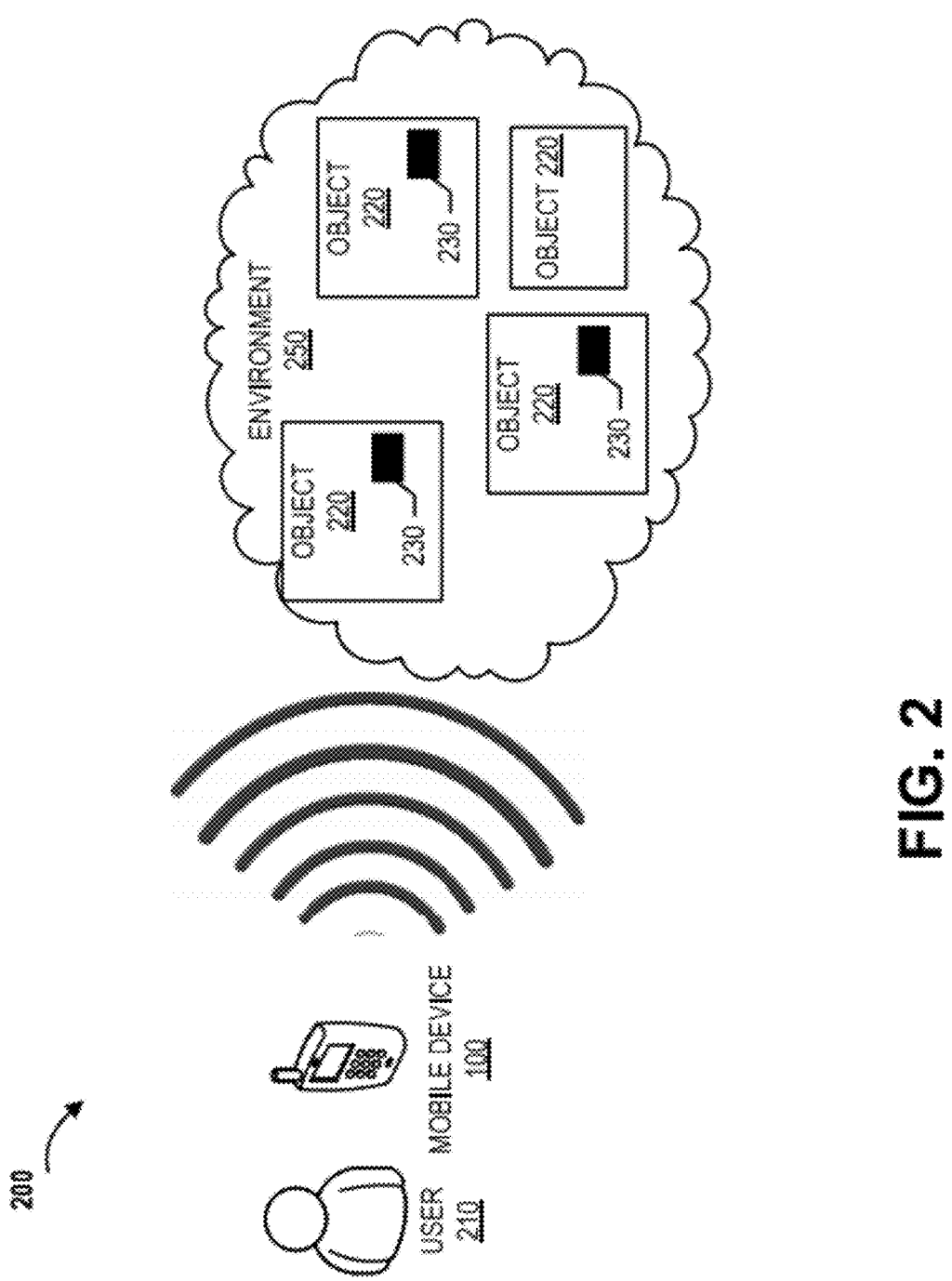
Figure 3:
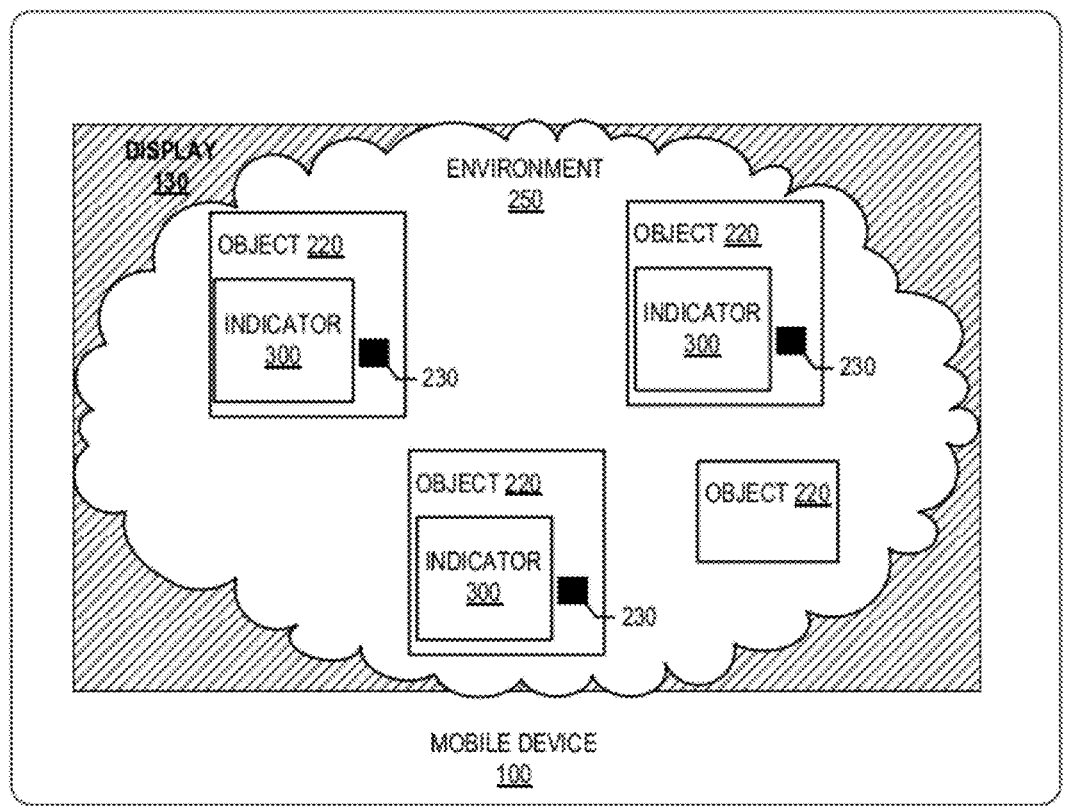
Figure 4:
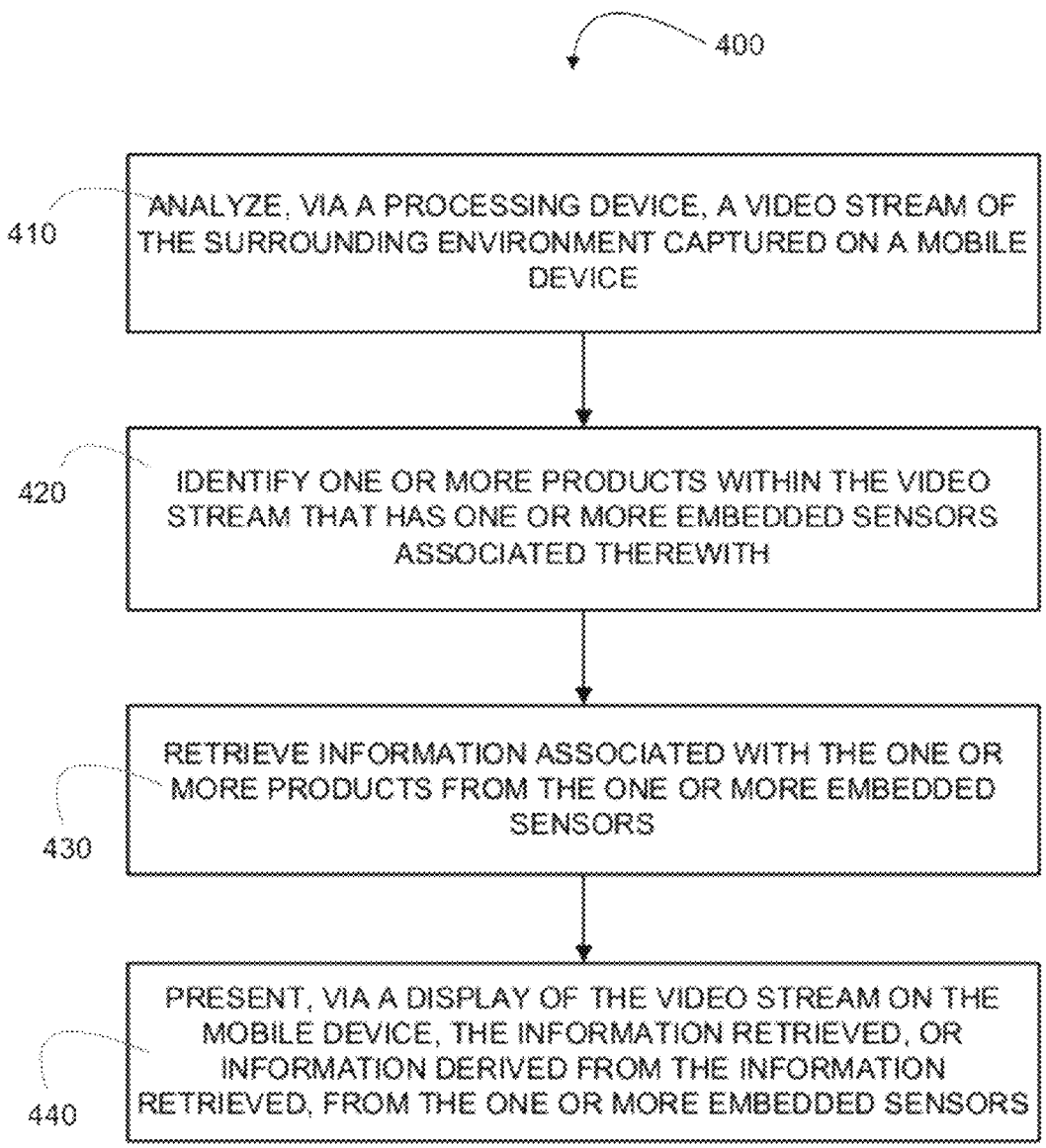
Figure 5:
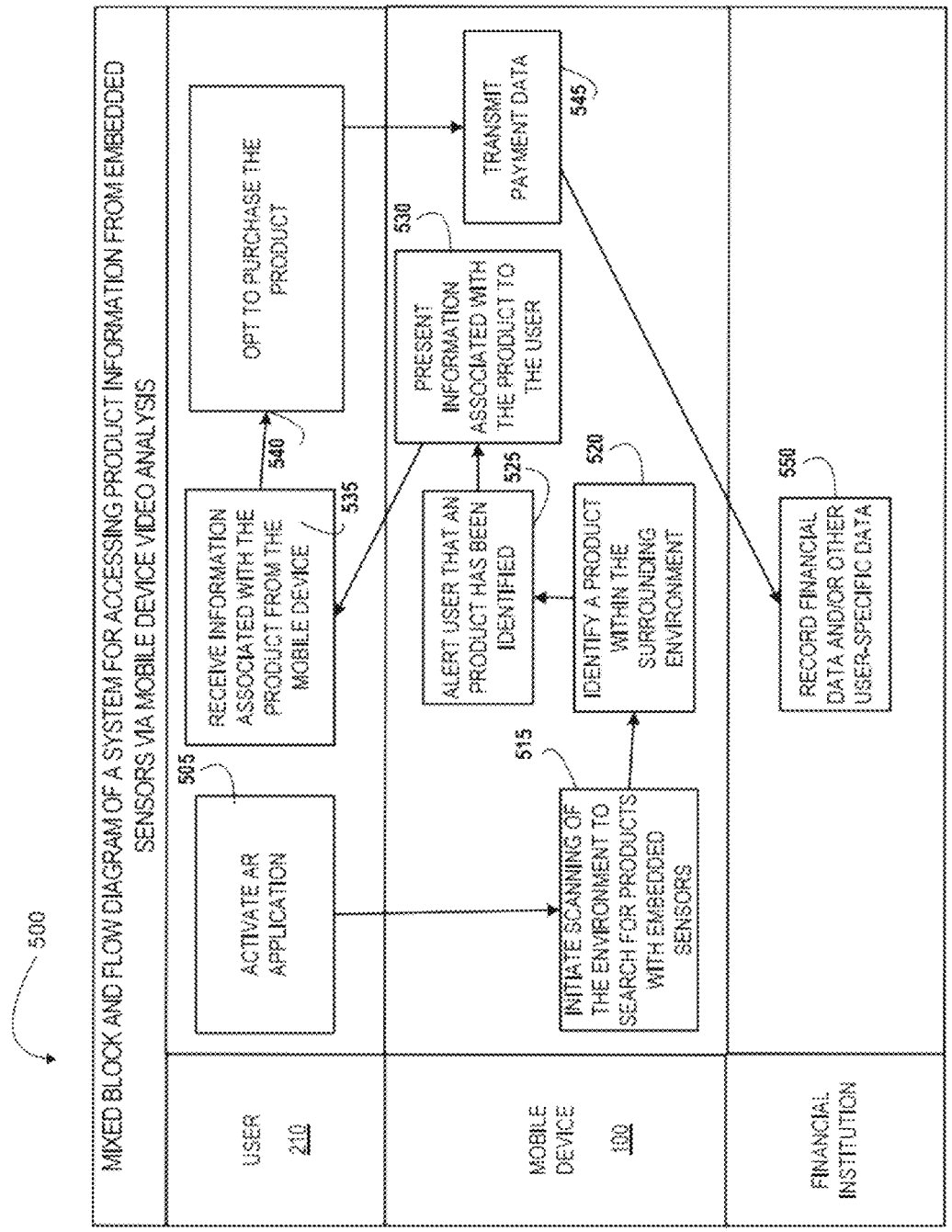
Figure 6:
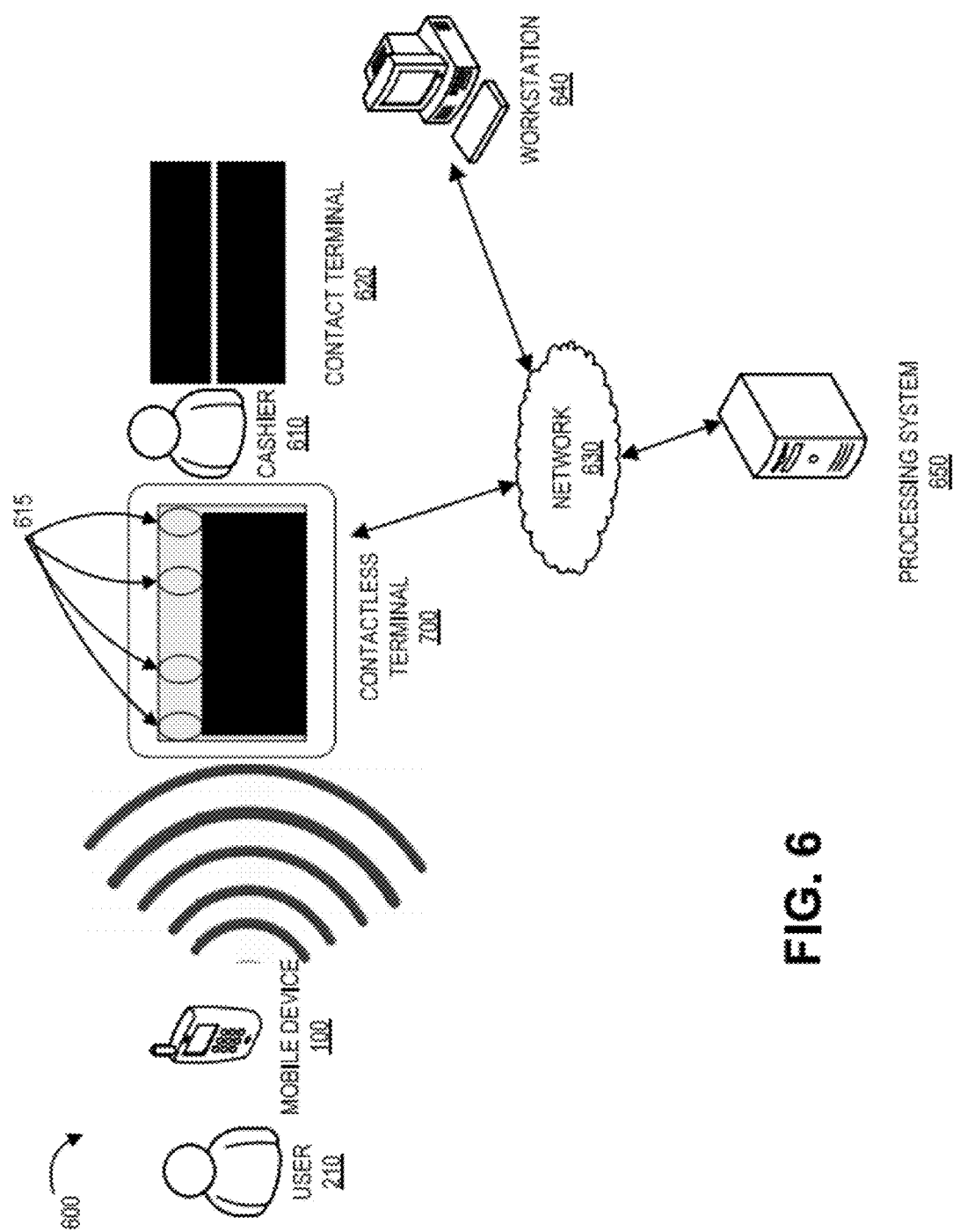
Figure 7:
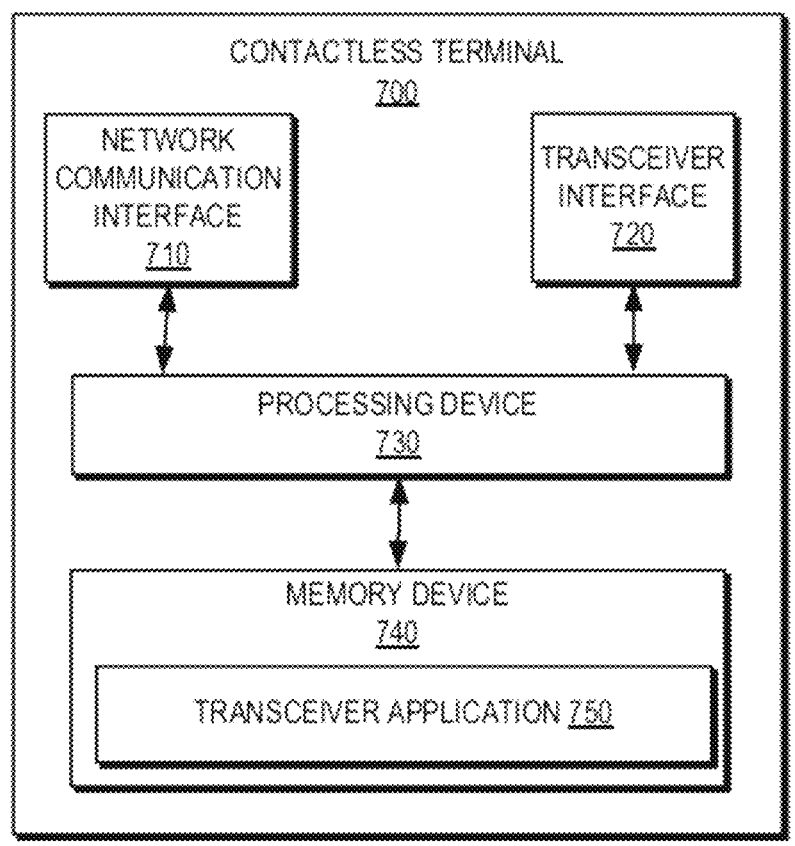

Having thus described embodiments of the invention in general terms, reference will now be made to the accompanying drawings, which are not necessarily drawn to scale, and wherein:

FIG. 1 is a block diagram illustrating a mobile device, in accordance with an embodiment of the invention;

FIG. 2 is a block diagram illustrating an AR environment, in accordance with an embodiment of the invention;

FIG. 3 is a block diagram illustrating a mobile device, in accordance with an embodiment of the invention;

FIG. 4 is a flow diagram illustrating a method for accessing product information from embedded sensors, in accordance with an embodiment of the invention;

FIG. 5 is a mixed block and flow diagram illustrating a system for accessing product information from embedded sensors, in accordance with an embodiment of the invention;

FIG. 6 is a block diagram illustrating a contactless payment environment, in accordance with an embodiment of the invention;

FIG. 7 is a block diagram illustrating the contactless payment terminal of FIG. 6, in accordance with an embodiment of the invention; and FIG. 8 illustrates a mobile wallet, in accordance with an embodiment of the invention.

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein are directed to sensors associated with the product. A sensor may sense or read a product status. In this way, a sensor may be any type of sensory device, including but not limited to a tag, RFID-chip, radio signal emitter, or marker embedded in a customer product that may provide an indication as to the status of a product. The status of a product may include the amount of the product used by the customer. For example, the status of a milk jug may be an indication as to how much milk is remaining in a container of milk stored in the customer's refrigerator. In some embodiments, the terms sensor or sensors are intended to refer to a sensor working in conjunction with one or more other devices. For example, in some embodiments, one or more tags are disposed in, on or proximate a product or other object and a sensor remote from tag reads the tag.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

Thus, methods, systems, computer programs and the like are herein disclosed that provide for using video analysis to process video streams and, more specifically, to access product information from embedded sensors and present information associated with the product to the user, which information may be presented via AR or the like. The methods, apparatus, systems, and computer program products may additionally provide for alerting the user to important or critical information associated with one or more products. In one embodiment, the user is presented with information pertaining to, and/or alerted to, important or critical product information, such as the depletion or expiration of a product that requires replacement or will require replacement in the near future. In one embodiment, the embedded sensors may provide all of the necessary information in order to present desired information to the user. However, in another embodiment, through the use of vision object recognition, objects, logos, artwork, products, locations and other features of a product (referred to herein as attributes) that can be recognized from the surrounding environment represented in the video stream can be identified and matched to stored data or data that can be accessed in real-time (collectively, "preexisting data"). In one embodiment, the preexisting data is specific to one or more financial institutions. For example, the preexisting data may comprise customer financial behavior history, customer credit score, customer purchase power/transaction history, vendor information (contact information, account information, payment requirements and acceptable forms of payment, etc.), information regarding products and services (e.g., costs, availability, etc.), and/or other financial information concerning the customer. In this regard, embodiments of the present invention leverage institutional or proprietary financial data that is uniquely specific to a particular financial institution to provide information to users in connection with the video stream analysis.

While embodiments discussed herein are generally described with respect to "video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Thus, embodiments in which real-time video, recorded video or still pictures are analyzed are contemplated herein.

FIG. 1 illustrates an embodiment of a mobile device 100 that may be configured to execute object recognition and Augmented Reality (AR) functionality, in accordance with specific embodiments of the present invention. A "mobile device" 100 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 100 may generally include a processor 110 communicably coupled to such devices as a memory 120, user output devices 136, user input devices 140, a network interface 160, a power source 115, a clock or other timer 150, an image capture device 170, a positioning system device 175 (e.g., a Global Positioning System (GPS) device), one or more integrated circuits 180, etc.

In some embodiments, the mobile device and/or the server access one or more databases or data stores (not shown in FIG. 1) to search for and/or retrieve information related to the object and/or marker. In some embodiments, the mobile device and/or the server access one or more data stores local to the mobile device and/or server and in other embodiments, the mobile device and/or server access data stores remote to the mobile device and/or server. In some embodiments, the mobile device and/or server access both a memory and/or data store local to the mobile device and/or server as well as a data store remote from the mobile device and/or server.

The processor 110, and other processors described herein, may generally include circuitry for implementing communication and/or logic functions of the mobile device 100. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to encode and interleave messages and data prior to modulation and transmission. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as an object recognition application 125. The object recognition application 14 may be downloaded from a server and stored in the memory 120 of the mobile device 100. Alternatively, the object recognition application 125 may be pre-installed and stored in a memory in the integrated circuit 180. In such an embodiment, the user may not need to download the object recognition application 125 from a server. In some embodiments, the processor 110 may also be capable of operating one or more applications, such as one or more applications functioning as an artificial intelligence ("AI") engine. The processor 110 may recognize objects that it has identified in prior uses by way of the AI engine. In this way, the processor 110 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The integrated circuit 180 may include the necessary circuitry to provide the object recognition functionality to the mobile device 100. Generally, the integrated circuit 180 will include data storage 171 which may include data associated with the objects within a video stream that the object recognition application 125 identifies as having a certain marker(s) (discussed in relation to FIG. 2). The integrated circuit 180 and/or data storage 171 may be an integrated circuit, a microprocessor, a system-on-a-integrated circuit, a microcontroller, or the like. As discussed above, in one embodiment, the integrated circuit 180 may provide the functionality to the mobile device 100.

Of note, while FIG. 1 illustrates the integrated circuit 180 as a separate and distinct element within the mobile device 100, it will be apparent to those skilled in the art that the object recognition functionality of integrated circuit 180 may be incorporated within other elements in the mobile device 100. For instance, the functionality of the integrated circuit 180 may be incorporated within the mobile device memory 120 and/or processor 110. In a particular embodiment, the functionality of the integrated circuit 180 is incorporated in an element within the mobile device 100 that provides object recognition capabilities to the mobile device 100. Still further, the integrated circuit 180 functionality may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the mobile device 100 may be configured to operate with one or more air interface standards, communication protocols, modulation types, and access types. By way of illustration, the mobile device 100 may be configured to operate in accordance with any of a number of first, second, third, and/or fourth-generation communication protocols and/or the like. For example, the mobile device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 100 may also be configured to operate in accordance with non-cellular communication mechanisms, such as via a wireless local area network (WLAN) or other communication/data networks.

The network interface 160 may also include an object recognition interface 173 in order to allow a user to execute some or all of the above-described processes with respect to the object recognition application 125 and/or the integrated circuit 180. The object recognition interface 173 may have access to the hardware, e.g., the transceiver, and software previously described with respect to the network interface 160. Furthermore, the object recognition interface 173 may have the ability to connect to and communicate with an external data storage on a separate system within the network as a means of recognizing the object(s) in the video stream.

As described above, the mobile device 100 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the mobile device 100 to receive data from a user, may include any of a number of devices allowing the mobile device 100 to receive data from a user, such as a keypad, keyboard, touch-screen, touchpad, microphone, mouse, joystick, other pointer device, button, soft key, and/or other input device(s).

The mobile device 100 may further include a power source 115. Generally, the power source 115 is a device that supplies electrical energy to an electrical load. In one embodiment, power source 115 may convert a form of energy such as solar energy, chemical energy, mechanical energy, etc. to electrical energy. Generally, the power source 115 in a mobile device 100 may be a battery, such as a lithium battery, a nickel-metal hydride battery, or the like, that is used for powering various circuits, e.g., the transceiver circuit, and other devices that are used to operate the mobile device 100. Alternatively, the power source 115 may be a power adapter that can connect a power supply from a power outlet to the mobile device 100. In such embodiments, a power adapter may be classified as a power source "in" the mobile device.

The mobile device 100 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the mobile device 100 described herein. For example, the memory 120 may include such applications as an object recognition application 125, an augmented reality (AR) presentation application 121 (described infra. in relation to FIG. 3), a web browser application 122, a Short Message Service (SMS) application 123, an electronic mail (i.e., email) application 124, etc.

Referring to FIG. 2, a block diagram illustrating an object recognition experience 200 in which a user 210 utilizes a mobile device 100 to capture a video stream that includes an environment 250 is shown. As denoted earlier, the mobile device 100 may be any mobile communication device. The mobile device 100 has the capability of capturing a video stream of the surrounding environment 250. The video capture may be by any means known in the art. In one particular embodiment, the mobile device 100 is a mobile telephone equipped with an image capture device 170 capable of video capture.

The environment 250 contains a number of objects 220. Some of such objects 220 may include a marker 230 identifiable to an object recognition application that is either executed on the mobile device 100 or within the wireless network. A marker 230 may be any type of marker that is a distinguishing feature that can be interpreted by the object recognition application to identify specific objects 220. For instance, a marker 230 may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 100 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object. For instance, the marker 230 may be some type of identifiable feature that is an indication that the object 220 is nearby (e.g., a tag or placard near the object). In some embodiments, the marker 230 for an object 220 may actually be the marker 230 for a different object 220. For example, the mobile device 100 may recognize a particular building as being "Building A." Data stored in the object recognition data storage may indicate that "Building B" is located directly to the east and next to "Building A." Thus, markers 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 100 to interpret to a desired confidence level what the object is. For another example, the mobile device 100 may identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be or include social network data, such as data retrieved or communicated from the Internet, such as tweets, blog posts, various types of messages and/or the like. In other embodiments, the marker 230 is provided in addition to social network data as mentioned above. For example, the mobile device 100 may capture a video stream and/or one or more still shots including a large gathering of people. In this example, as above, one or more people dressed as characters in costumes may be present at a specified location. The mobile device 100, object recognition application 121, and/or the AR presentation application 125 may identify several social network indicators, such as posts, blogs, tweets, messages, and/or the like indicating the presence of one or more of the characters at the specified location. In this way, the mobile device 100 and associated applications may communicate information regarding the social media communications to the user and/or use the information regarding the social media communications in conjunction with other methods of object recognition. For example, the mobile device 100 object recognition application 121, and/or the AR presentation application 125 performing recognition of the characters at the specified location may confirm that the characters being identified are in fact the correct characters based on the retrieved social media communications. This example may also be applied objects outside of people.

In some embodiments, the mobile device 100 and/or server access one or more other servers, social media networks, applications and/or the like in order to retrieve and/or search for information useful in performing an object recognition. In some embodiments, the mobile device 100 and/or server accesses another application by way of an application programming interface or API. In this regard, the mobile device 100 and/or server may quickly search and/or retrieve information from the other program without requiring additional authentication steps or other gateway steps.

While FIG. 2 illustrates that the objects 220 with markers 230 only include a single marker 230, it will be appreciated that the object 220 may have any number of markers 230 with each equally capable of identifying the object 220. Similarly, multiple markers 66 may be identified by the mobile device 100 and associated applications such that the combination of the markers 230 may be utilized to identify the object 220. For example, the mobile device 100 may utilize facial recognition markers 230 to identify a person and/or utilize a separate marker 230, such as the clothes the person is wearing to confirm the identification to the desired confidence level that the person is in fact the person the mobile device identified. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 100 may utilize Global Positioning System (GPS) hardware and/or software or some other location determining mechanism to determine the location of the user 210 and/or object 220. As noted above, a location-based marker 230 could be utilized in conjunction with other non-location-based markers 230 identifiable and recognized by the mobile device 100 to identify the object 220. However, in some embodiments, a location-based marker may be the only marker 230. For instance, in such embodiments, the mobile device 100 may utilize GPS software to determine the location of the user 210 and a compass device or software to determine what direction the mobile device 100 is facing in order to identify the object 220. In still further embodiments, the mobile device 100 does not utilize any GPS data in the identification. In such embodiments, markers 230 utilized to identify the object 220 are not location-based.

FIG. 3 illustrates a mobile device 100, specifically the display 130 of the mobile device 100, wherein the device 100 has executed an object recognition application 125 and an AR presentation application 121 to present within the display 130 indications of recognized objects within the live video stream (i.e., surrounding environment 250). The mobile device 100 is configured to rely on markers 230 to identify objects 220 that are associated with product offers, products with extended warranties, new products and the like, and indicate to the user 210 the identified objects 220 by displaying an indicator 300 on the mobile device display 130 in conjunction with display of the live video stream. As illustrated, if an object 220 does not have any markers 230 (or at least enough markers 230 to yield object identification), the object 220 will be displayed without an associated indicator 300.

The object recognition application 125 may use any type of means in order to identify desired objects 220. For instance, the object recognition application 125 may utilize one or more pattern recognition algorithms to analyze objects in the environment 250 and compare with markers 230 in data storage 171 which may be contained within the mobile device 100 (such as within integrated circuit 180) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the AR presentation application 121 is configured to superimpose an indicator 300 on the mobile device display 130. The indicator 300 is generally a graphical representation that highlights or outlines the object 220 and may be activatable (i.e., include an embedded link), such that the user 210 may "select" the indicator 300 and retrieve information related to the identified object. The information may include any desired information associated with the selected object and may range from basic information to greatly detailed information. In some embodiments, the indicator 300 may provide the user 210 with an internet hyperlink to further information on the object 220. The information may include, for example, all types of media, such as text, images, clipart, video clips, movies, or any other type of information desired. In yet other embodiments, the indicator 300 information related to the identified object may be visualized by the user 210 without "selecting" the indicator 300.

In embodiments in which the indicator 300 provides an interactive tab to the user 210, the user 210 may select the indicator 300 by any conventional means, e.g., keystroke, touch, voice command or the like, for interaction with the mobile device 100. For instance, in some embodiments, the user 210 may utilize an input device 140 such as a keyboard to highlight and select the indicator 300 in order to retrieve the information. In a particular embodiment, the mobile device display 130 includes a touch screen that the user may employ to select the indicator 300 utilizing the user's finger, a stylus, or the like.

In some embodiments, the indicator 300 is not interactive and simply provides information to the user 210 by superimposing the indicator 300 onto the display 130. For example, in some instances it may be beneficial for the AR presentation application 121 to merely identify an object 220, e.g., just identify the object's name/title, give brief information about the object, etc., rather than provide extensive detail that requires interaction with the indicator 300. The AR presentation application 121 is capable of being tailored to a user's desired preferences.

Furthermore, the indicator 300 may be displayed at any size on the mobile device display 130. The indicator 300 may be small enough that it is positioned on or next to the object 220 being identified such that the object 220 remains discernible behind the indicator 300. Additionally, the indicator 300 may be semi-transparent or an outline of the object 220, such that the object 220 remains discernible behind or enclosed by the indicator 300. In other embodiments, the indicator 300 may be large enough to completely cover the object 220 portrayed on the display 130. Indeed, in some embodiments, the indicator 300 may cover a majority or the entirety of the mobile device display 130.

The user 210 may opt to execute the object recognition application 125 and AR presentation application 121 at any desired moment and begin video capture and analysis. However, in some embodiments, the object recognition application 125 and AR presentation application 121 includes an "always on" feature in which the mobile device 100 is continuously capturing video and analyzing the objects 220 within the video stream. In such embodiments, the object recognition application 125 may be configured to alert the user 210 that a particular object 220 has been identified. The user 210 may set any number of user preferences to tailor the object recognition and AR presentation experience to their needs. For instance, the user 210 may opt to only be alerted if a certain particular object 220 is identified. Additionally, it will be appreciated that the "always on" feature in which video is continuously captured may consume the mobile device power source 115 more quickly. Thus, in some embodiments, the "always on" feature may disengage if a determined event occurs such as low power source 115, low levels of light for an extended period of time (e.g., such as if the mobile device 100 is in a user's pocket obstructing a clear view of the environment 250 from the mobile device 100), if the mobile device 100 remains stationary (thus receiving the same video stream) for an extended period of time, the user sets a certain time of day to disengage, etc. Conversely, if the "always on" feature is disengaged due to the occurrence of such an event, the user 210 may opt for the "always on" feature to re-engage after the duration of the disengaging event (e.g., power source 115 is re-charged, light levels are increased, etc.).

In some embodiments, the user 210 may identify objects 220 that the object recognition application 125 does not identify and add it to the data storage 171 with desired information in order to be identified and/or displayed in the future. For instance, the user 210 may select an unidentified object 220 and enter a name/title and/or any other desired information for the unidentified object 220. In such embodiments, the object recognition application 125 may detect/record certain markers 230 about the object so that the pattern recognition algorithm(s) (or other identification means) may detect the object 220 in the future. Furthermore, in cases where the object information is within the data storage 171, but the object recognition application 125 fails to identify the object 220 (e.g., one or more identifying characteristics or markers 230 of the object has changed since it was added to the data storage 171 or the marker 230 simply was not identified), the user 210 may select the object 220 and associate it with an object 220 already stored in the data storage 171. In such cases, the object recognition application 125 may be capable of updating the markers 230 for the object 220 in order to identify the object 220 in future video streams.

In addition, in some embodiments, the user 210 may opt to edit the information or add to the information provided by the indicator 300. For instance, the user 210 may opt to include user-specific information about a certain object 220 such that the information may be displayed upon a future identification of the object 220. Conversely, in some embodiments, the user may opt to delete or hide an object 220 from being identified and an indicator 300 associated therewith being displayed on the mobile device display 130.

Furthermore, in some instances, an object 220 may include one or more markers 230 identified by the object recognition application 125 that leads the object recognition application 125 to associate an object 220 with more than one objects 220 in the data storage 171. In such instances, the user 210 may be presented with multiple candidate identifications and may opt to choose the appropriate identification or input a different identification. The multiple candidates may be presented to the user 210 by any means. For instance, in one embodiment, the candidates are presented to the user 210 as a list wherein the "strongest" candidate is listed first based on reliability of the identification. Upon input by the user 210 identifying the object 220, the object recognition application 125 may "learn" from the input and store additional markers 230 in order to avoid multiple identification candidates for the same object 220 in future identifications.

Additionally, the object recognition application 125 may utilize other metrics for identification than identification algorithms. For instance, the object recognition application 125 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 210 may input preferences or other metrics for which the object recognition application 125 may utilize to narrow results of identified objects 220.

In some embodiments, the AR presentation application 121 may have the ability to gather and report user interactions with displayed indicators 300. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects 220 that is retrieved for presentation to a user 210 via the mobile device 100 may be permanently or semi-permanently associated with the object 220. In other words, the object 220 may be "tagged" with the information. In some embodiments, a location pointer is associated with an object 220 after information is retrieved regarding the object 220. In this regard, subsequent mobile devices capturing the object 220 for recognition may retrieve the associated information, tags and/or pointers in order to more quickly retrieve information regarding the object 220. In some embodiments, the mobile device 100 provides the user 210 an opportunity to post messages, links to information or the like and associate such postings with the object 220. Subsequent users may then be presenting such postings when their mobile devices capture and recognize an object 220. In some embodiments, the information gathered through the recognition and information retrieval process may be posted by the user 210 in association with the object 220. Such tags and/or postings may be stored in a predetermined memory and/or database for ease of searching and retrieval.

In an exemplary embodiment, the AR presentation application 121 is capable of analyzing the surrounding environment 250 in search of products with embedded sensors FIG. 4 illustrates a high-level flow diagram of a method 400 for analyzing the surrounding environment 250 in search of products with embedded sensors according to an embodiment of the invention.

At block 410, a video stream of the surrounding environment 250 is analyzed in search of at least one product with an embedded sensor. As used herein, an "embedded sensor" is a device associated with a product in such a way that the sensors may monitor, obtain, collect, emit, and/or indicate information about the product. In one embodiment, the embedded sensors may include, at least in part, an RFID tag, a chip, a radio signal emitter, an invisible marker, etc. In another embodiment, an embedded tag includes a nanosensor. For example, the nanosensors or microsensors may be configured to measure acceleration, conductivity, electromagnetic field, friction, light, movement, quantity, radiation, sound, stress, temperature, time, vibration, viscosity, weight, or some other measurable physical quantity or characteristic. The sensors may be capable of wireless transmission of such information, either continuously or intermittently. In one embodiment, the sensors may automatically transmit the information, whereas in another embodiment, the sensors may transmit the information in response to being interrogated. The information transmitted from an embedded sensor may include, for instance, "defaults" with the product. As used herein, a "default" may be anything concerning the product that may lead to its replacement or maintenance. For instance, a default may include a food product that has reached its expiration date (i.e., replacement needed) or a shortage in the circuitry of an electronic-based product (i.e., maintenance or repair services needed).

The mobile device 100 may be capable of detecting or sensing embedded sensors within products. The detection may utilize any marker 230 as described above in the identification of the product. However, in one embodiment, the only marker 230 required for product identification is the embedded sensors. In such embodiments, generally, the embedded sensor emits a wireless signal which is detectable to the AR presentation application 121 of the mobile device 100.

Block 420 illustrates the step of identifying one or more products within the video stream that has one or more embedded sensors associated therewith. As the video stream is analyzed (block 410), the AR presentation application 121 may detect an embedded sensors emitting a wireless signal (e.g., an RF signal).

At block 430, the mobile device 100 retrieves the information associated with the products from the embedded sensors. In one embodiment, the AR presentation application 121 is capable of receiving information from multiple embedded sensors at once. For example, a user 210 may utilize the AR presentation application 121 to scan the pantry or refrigerator, for instance, and receive information from a plurality of products at once. As noted above, the information may include data concerning the products such that the user 210 may determine what action needs to be taken (e.g., product replacement).

At block 440, the AR presentation application 121 may present information to the user via the mobile device display of the video stream. For instance, a indicator 300 may be superimposed onto the video stream on the display 130 of the mobile device 100. The indicator 300 may be interactive. In one embodiment, the indicator 300 may include the information transmitted from the embedded sensors explicitly (e.g., amount of product remaining, expiration date, etc.). However, in one embodiment, the AR presentation application 121 may present information to the user 210 that is derived from the information received from the embedded sensors. For example, a user 210 that utilizes the AR presentation application 121 to analyze the products within a refrigerator may opt to have a shopping list automatically generated based on preset preferences that determine when certain products need to be replaced.

In one embodiment, the mobile device 100 is operated in the "always on" mode to continuously analyze the surrounding environment 250 to detect product embedded sensors. Thus, in one embodiment, the user 210 actively utilizes the mobile device 100 in search of products with embedded sensors by viewing the mobile device display 130 as the user 210 pans around scanning for products. However, in another embodiment, the user 210 passively utilizes the mobile device 100 in search of predetermined objects. In such embodiments, the mobile device 100 may simply be affixed to or otherwise carried by the user 210 and the mobile device 100 simply scans the images captured in search of products with embedded sensors.

The mobile device 100 may alert the user 210 to important or critical information associated with one or more products. As used herein, "important" or "critical" information may be defined by the user 210, but will generally include information concerning product defaults or impending product defaults. The user 210 may opt to input preferences as to when to be alerted of an impending product default such as the quantity of product is approaching a predetermined threshold or the expiration date of a product is approaching. Similarly, as noted above, a product default may include something that is irregular with the product such as a power source malfunction, a drop in efficiency, hardware/software malfunctions, etc. The "alert" to the user 210 may be one or more indicators that appear on the mobile device display 130. However, when the AR presentation application 121 is operated in a passive mode (i.e., the user 210 is not attentive to and watching the video stream being analyzed), it is generally preferable that the alerts be of audible signals, vibration of the mobile device 100, Short Message Service/text messages, emails or the like which may identify the object, provide access to an offer or direct the user to the video stream (real-time or recorded) for access to the displayed indicators 300.

The "product" detectable to the AR presentation application 121 will generally include any product that utilizes an embedded sensors capable of emitting a wireless signal. In one embodiment, the product is a food product. In another embodiment, the product is a household item such as a household appliance. In still further embodiments, the product may be an automobile, an electronic device, a non-food consumer product, etc.

In a particular embodiment, the indicator 300 displayed to the user 210 is interactive and may present the user 210 with information regarding purchasing the product. For instance, the information may include cost of replacement, estimated time to failure, nearest retailer stocking the product, estimated delivery time, etc. Additionally, the user 210 may be presented with the option to purchase the product. For instance, the indicator 300 displayed on the mobile device 100 may include a link, such as, for example, an internet hyperlink, that gives the user 210 the option to purchase the product.

FIG. 5 illustrates a high-level mixed block and flow diagram of a system 500 for accessing product information from embedded sensors via a video stream captured by a mobile device 100. It will be understood that the system 500 illustrated is an exemplary embodiment. As shown, the system 500 includes a user 210, a mobile device 100, and a financial institution.

As represented by block 505, the user 210 activates the AR presentation application 121 of the mobile device 100. The AR presentation application 121 may be operated in active mode or passive mode as discussed above. Once the mobile device 100 loads the AR presentation application 121, the mobile device 100 initiates scanning of the environment 250 to search for the products with embedded sensors, as represented by block 515.

At block 520, the mobile device 100 then may identify a product within the surrounding environment 250. Upon identifying a product, the mobile device 100 alerts the user 210 that the product has been identified as shown in block 525. The alert may be any way to bring the identification to the user's attention. In a particular embodiment, the mobile device display 130 may include an indicator and the mobile device 100 may emit an audible sound and/or vibration or other type of alert as discussed above.

In some embodiments, the information provided by the real-time video stream may be compared to data provided to the system through an API. In this way, the data may be stored in a separate application and be implemented by request from the mobile device and/or server.

At block 530, the mobile device 100 may present information associated with the product to the user 210, and as illustrated at block 535, the user 210 may receive the information associated with the object. The information displayed to the user may range from a simple identification of the object to a large amount of data associated with the object, depending, at least in part, on the sophistication of the embedded sensors.

In a particular embodiment, the information displayed to the user 210 may include product purchasing information. In such embodiments, the user may opt to purchase the product as shown in block 540. The user 210 may opt to utilize any feasible means in purchasing the product. In some embodiments, the business that sells the product may be capable of accepting online orders for the identified object via the Internet, an intranet or other wireless connection utilizing the mobile device 100. In a particular embodiment, the mobile device 100 includes a mobile wallet 800 (FIG. 8) and the business is capable of receiving payment vehicle data from the user's mobile device 100 via a contactless payment terminal 700 (FIGS. 6 and 7) as discussed further below. Thus, as illustrated at block 545, the mobile device 100 may transmit payment data for purchase of the product.

As represented by block 550, a financial institution may monitor and record financial data and/or video image analysis user data associated with the object identification. For instance, the data the financial institution may record includes the amount of time the user reviewed the presented information, whether the user 210 was presented with an option to purchase, whether the user 210 purchased the product, the price of the product, the frequency in which the user utilizes the AR presentation application 121 to identify and purchase objects, etc. Such information may be beneficial to the financial institution in determining future business strategies.

The mobile device 100 may be equipped to provide the user 210 the ability to transmit payment information directly from the mobile device 100 to a payment terminal in order to complete a purchase. Referring to FIG. 6, a block diagram illustrating a contactless transaction environment 500 configured for making a contactless transaction via a mobile device 100 is shown. As illustrated, the contactless transaction environment 600 may include a mobile device 100 operable by a user 210 who may be a customer who wishes to make a contactless payment for the identified product. The contactless transaction environment 600 may also include a contactless terminal 700 that may be automated or may be operable by a cashier 610. The contactless terminal 700 may permit a user 210 to make a contactless payment with the mobile device 100.

Of course, the environment 600 may also include a contact terminal 620 that may permit a user 210 to make a payment via a contact transaction device such as a payment card that has a magnetic stripe which may be swiped through the contact terminal 620.

The contactless transaction environment 600 may also include a workstation 640 and a processing system 650 that are in electronic communication with the contactless terminal 700 via a network 630, which may be the Internet, an intranet or the like. The user interface 615 situated on the contactless terminal 700 may be any sort of device, such as light emitting diodes (LEDs) for indicating that payment has been received, invalid payment vehicle, exceeded credit limit, etc.

In FIG. 6, the network 630 may include a local area network (LAN), a wide area network (WAN), and/or a global area network (GAN). The network 630 may provide for wireline, wireless, or a combination of wireline and wireless communication between devices in the network. In some embodiments, the network 630 includes the Internet. In some embodiments, the network 630 may include a wireless telephone network.

FIG. 7 illustrates an embodiment of a contactless terminal 700 that is depicted in FIG. 6. The contactless terminal 700 may include various features, such as a network communication interface 710, a processing device 730, a transceiver interface 720, and a memory device 740 that may include a transceiver application 750.

As used with respect to the contactless terminal 700, a "communication interface" may generally include a modem, server, transceiver, and/or other device for communicating with other devices on a network. The network communication interface 710 may be a communication interface having one or more communication devices configured to communicate with one or more other devices in the contactless transaction environment 600, such as the mobile device 100, the workstation 640, the processing system 650, other processing systems, data systems, etc.

In one embodiment, the transceiver interface 720 is a separate module that may generally include a transceiver, i.e., one or more antennas and/or other electronic circuitry, devices, and software, for receiving electronic payment vehicle data when the mobile device 100 is held close to or "tapped" at the contactless terminal 700. In accordance with embodiments of the invention, the term "tap," "tapped," "tapping," etc. may refer to bringing a mobile device close to or within the proximity of a payment terminal so that information can be communicated wirelessly between the mobile device and the payment terminal using short range wireless transmission technology, such near-field communication (NFC) technology, radio-frequency (RF) technology, or the like. Tapping may include physically tapping the mobile device against an appropriate portion of the payment terminal or it may include only waving or holding the mobile device near an appropriate portion of the payment terminal without making physical contact with the payment terminal. In some embodiments, the transceiver interface 720 is part of the network communication interface 710. Furthermore, the transceiver interface 720 may also be used as an interface to send data to the mobile device 100 when the mobile device 100 is held close to or tapped at the contactless terminal 700.

An output device for the transceiver interface 720 may include a display that provides instructions regarding the steps for making a contactless transaction. In some embodiments where the contactless terminal 700 requests authentication, such as a signature, the display may also serve as a touchpad input device to input the user's signature via a stylus. Other output devices may include one or more LEDs or an audio speaker, both which may indicate to the user 210 that data has been successfully received from the mobile device 100. A printer that can print paper receipts may also be incorporated into the contactless terminal 700. Other embodiments of the contactless terminal 700 may carry other input and output devices, such as a mouse, keyboard, button, touchpad, touch screen, microphone, speaker, light, joystick, switch, or the like.

As used with respect to the contactless terminal 700, a "processing device," 730 may generally refer to a device or combination of devices having circuitry used for implementing the communication and/or logic functions of a particular system. For example, a processing device 730 may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 730 may be configured to use the network communication interface 710 and/or the transceiver interface 720 to transmit and/or receive data and/or commands to and/or from the other devices that are visible in the contactless payment environment 600.

As used with respect to the contactless terminal 700, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein. In one embodiment, the memory device stores a transceiver application 750. The transceiver application 750 may work in conjunction with the previously described transceiver interface 720 to receive electronic payment vehicle data when the mobile device 100 is held close to or tapped at the contactless terminal 700. In some embodiments, the transceiver application 750 may also be configured to send data to the mobile device 100 when the mobile device 100 is held close to or tapped at the payment terminal 700, or potentially provide a power source 115 to the mobile device 100 in the event the primary power source is depleted.

As illustrated in FIG. 6, a contactless terminal 200 may be connected to a workstation 640 via the network 630. The workstation 640 may be used by the cashier 610 or other personnel to interact with the contactless terminal 700. The workstation 640 may include various features, such as a network communication interface, a processing device, a user interface, and a memory device.

As used with respect to the workstation 640, a "communication interface" may generally include a modem, server, transceiver, and/or other device for communicating with other devices on a network. The network communication interface may be a communication interface having one or more communication devices configured to communicate with one or more other devices on the network 630, such as the contactless terminal 700 and/or contact terminal 620, the processing system 650, other processing systems, data systems, etc.

As used with respect to the workstation 130, a "processing device" may generally refer to a device or combination of devices having circuitry used for implementing the communication and/or logic functions of a particular system as described above. For example, a processing device may include a digital signal processor device, a microprocessor device, and various analog-to-digital converters, digital-toanalog converters, and other support circuits and/or combinations of the foregoing. Control and signal processing functions of the system may be allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device may be configured to use a network communication interface and/or the transceiver interface to transmit and/or receive data and/or commands to and/or from the other devices that are visible in the network 630.

As used with respect to the workstation 640, a "user interface" may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 210 or the cashier 610 or output data to the user or the cashier 610. These input and output devices may include a display, mouse, keyboard, button, touchpad, touch screen, microphone, speaker, light, joystick, switch, and/or other customer input/output device for communicating with one or more customers. As used with respect to the workstation 640, a "memory device" may generally refer to a device or combination of devices that store one or more forms of computer-readable media for storing data and/or computer-executable program code/instructions. For example, in one embodiment, the memory device may include any computer memory that provides an actual or virtual space to temporarily or permanently store data and/or commands provided to the processing device when it carries out its functions described herein.

As indicated above, in some embodiments, the user 210 may opt to utilize the mobile device 100 to wirelessly transmit payment vehicle data to a contactless terminal 700. Typically, the payment vehicle data is stored within the mobile device 100 or accessible externally through the network. This payment vehicle data is typically contained within a mobile wallet. In accordance with embodiments of the invention, the phrase "mobile wallet" refers to the hardware and/or software in a mobile device that enables the mobile device to be used to make contactless payments at a payment terminal. In accordance with embodiments of the invention, the term "payment vehicle" may refer to an electronic payment vehicle, such as an electronic credit or debit card. The payment vehicle may not be a "card" at all and may instead be account identifying information stored electronically in a mobile device, such as in a cell phone.

Turning to FIG. 8, one embodiment of a mobile wallet 800 is illustrated. Importantly, the mobile wallet 800 of the present invention is not limited to the embodiments shown in the figures. Indeed, the manner in which the "menu" of payment vehicles 810 is presented to the user or the type of additional information stored within the mobile wallet 800 is not essential to the present invention.

As illustrated, information contained within the mobile wallet 800 and capable of being transmitted by the mobile device 100 may include the payment vehicle type 810, the unique payment vehicle account number 820 associated with the payment vehicle 810, the name associated with the payment vehicle 830, the payment vehicle's expiration date 840, the payment vehicle's security code 850, whether the payment vehicle is credit or debit 860 and the default payment vehicle 870 for use in transactions.

Thus, methods, systems, computer programs and the like are herein disclosed that provide for using video analysis to process video streams and, more specifically, to access product information from embedded sensors and present information associated with the product to the user, which information may be presented via AR or the like. The methods, apparatuses, systems, and computer program products may additionally provide for alerting the user to important or critical information associated with one or more products. Many of the embodiments herein disclosed leverage financial institution data, which is uniquely specific to financial institution, in providing information to mobile device users in connection with video stream analysis.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |

-continued

| U.S. Provisional Ser. No. | Filed On | Title |
|---|---|---|
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

What is claimed is:

1. A method for accessing product information from embedded sensors comprising:
analyzing, via a processing device, a real-time video stream representing the surrounding environment captured on a mobile device;
identifying one or more products within the video stream that has one or more embedded sensors associated therewith;
retrieving information associated with the one or more products from the one or more embedded sensors;
presenting, via a display of the video stream on the mobile device, the information retrieved, or information derived from the information retrieved, from the one or more embedded sensors, wherein presenting the retrieved or derived information comprises superimposing the retrieved or derived information over the video stream of the one or more products; and
alerting, via the display, the user to critical information associated with the one or more products, wherein the critical information comprises information regarding a product default or an impending product default, wherein the product default is a mechanical default requiring maintenance.

2. The method of claim 1, wherein the mobile device is a mobile phone.

3. The method of claim 1, wherein the mobile device comprises a camera capable of image and/or video capture.

4. The method of claim 1, wherein the one or more embedded sensors emit a radio frequency signal.

5. The method of claim 1, wherein the information presented is displayed as a virtual object overlaying the video stream of the surrounding environment.

6. The method of claim 5, wherein the virtual object is interactive.

7. The method of claim 1, wherein the mobile device is operated in the "always on" mode to continuously analyze the surrounding environment.

8. The method of claim 1, wherein the product default is the depletion or expiration of a product requiring replacement.

9. The method of claim 1, wherein the step of alerting the user comprises producing an audible sound, vibration, generating a Short Message Service or text message, generating an email, or combinations thereof.

10. The method of claim 1, wherein the one or more products is a food product.

11. The method of claim 1, wherein the one or more products is a household item.

12. The method of claim 11, wherein the household item is a household appliance.

13. The method of claim 1, further comprising presenting the user with an option to purchase the one or more products via the mobile device.

14. The method of claim 1, further comprising transmitting payment information from the mobile device to a seller of the one or more products in order to purchase the one or more products.

15. The method of claim 1, further comprising transmitting payment information via a wireless connection between the mobile device and a contactless payment terminal to purchase a product or service.

16. The method of claim 1, further comprising transmitting financial data and/or other user-specific data to a financial institution.

17. A system for accessing product information from embedded sensors comprising:
a processing device configured for:
analyzing a real-time video stream representing the surrounding environment captured on a mobile device;
identifying one or more products within the video stream that has one or more embedded sensors associated therewith;
retrieving information associated with the one or more products from the one or more embedded sensors;
presenting, via a display of the video stream on the mobile device, the information retrieved, or information derived from the information retrieved, from the one or more embedded sensors, wherein presenting the retrieved or derived information comprises superimposing the retrieved or derived information over the video stream of the one or more products; and alerting, via the display, the user to critical information associated with the one or more products, wherein the critical information comprises information regarding a product default or an impending product default, wherein the product default is a mechanical default requiring maintenance.

18. The system of claim 17, wherein the mobile device is a mobile phone.

19. The system of claim 17, wherein the mobile device comprises a camera capable of image and/or video capture.

20. The system of claim 17, wherein the one or more embedded sensors emit a radio frequency signal.

21. The system of claim 17, wherein the information presented is displayed as a virtual object overlaying the video stream of the surrounding environment.

22. The system of claim 21, wherein the virtual object is interactive.

23. The system of claim 17, wherein the mobile device is operated in the "always on" mode to continuously analyze the surrounding environment.

24. The system of claim 17, wherein the product default is the depletion or expiration of a product requiring replacement.

25. The system of claim 17, wherein alerting the user comprises producing an audible sound, vibration, generating a Short Message Service or text message, generating an email, or combinations thereof.

26. The system of claim 17, wherein the one or more products is a food product.

27. The system of claim 17, wherein the one or more products is a household item.

28. The system of claim 27, wherein the household item is a household appliance.

29. The system of claim 17, wherein the processing device is further configured to present the user with an option to purchase the one or more products via the mobile device.

30. The system of claim 17, wherein the processing device is further configured to transmit payment information from the mobile device to a seller of the one or more products in order to purchase the one or more products.

31. The system of claim 17, wherein the processing device is further configured to transmit payment information via a wireless connection between the mobile device and a contactless payment terminal to purchase a product or service.

32. The system of claim 17, wherein the processing device is further configured to transmit financial data and/or other user-specific data to a financial institution.

33. A computer program product for accessing product information from embedded sensors comprising a non-transitory computer readable medium comprising one or more computer-readable code portions configured for:
  analyzing a real-time video stream representing the surrounding environment captured on a mobile device;
  identifying one or more products within the video stream that has one or more embedded sensors associated therewith;
  retrieving information associated with the one or more products from the one or more embedded sensors;
  presenting, via a display of the video stream on the mobile device, the information retrieved, or information derived from the information retrieved, from the one or more embedded sensors, wherein presenting the retrieved or derived information comprises superimposing the retrieved or derived information over the video stream of the one or more products; and
  alerting, via the display, the user to critical information associated with the one or more products, wherein the critical information comprises information regarding a product default or an impending product default, wherein the product default is a mechanical default requiring maintenance.

34. The computer program product of claim 33, wherein the mobile device is a mobile phone.

35. The computer program product of claim 33, wherein the mobile device comprises a camera capable of image and/or video capture.

36. The computer program product of claim 33, wherein the one or more embedded sensors emit a radio frequency signal.

37. The computer program product of claim 33, wherein the information presented is displayed as a virtual object overlaying the video stream of the surrounding environment.

38. The computer program product of claim 37, wherein the virtual object is interactive.

39. The computer program product of claim 33, wherein the mobile device is operated in the "always on" mode to continuously analyze the surrounding environment.

40. The computer program product of claim 33, wherein the product default is the depletion or expiration of a product requiring replacement.

41. The computer program product of claim 33, wherein alerting the user comprises producing an audible sound, vibration, generating a Short Message Service or text message, generating an email, or combinations thereof.

42. The computer program product of claim 33, wherein the one or more products is a food product.

43. The computer program product of claim 33, wherein the one or more products is a household item.

44. The computer program product of claim 43, wherein the household item is a household appliance.

45. The computer program product of claim 33, wherein the one or more computer-readable code portions is further configured to present the user with an option to purchase the one or more products via the mobile device.

46. The computer program product of claim 33, wherein the one or more computer-readable code portions is further configured to transmit payment information from the mobile device to a seller of the one or more products in order to purchase the one or more products.

47. The computer program product of claim 33, wherein the one or more computer-readable code portions is further configured to transmit payment information via a wireless connection between the mobile device and a contactless payment terminal to purchase a product or service.

48. The computer program product of claim 33, wherein the one or more computer-readable code portions is further configured to transmit financial data and/or other user-specific data to a financial institution.

* * * * *